US008717665B2

(12) United States Patent
Gerbier et al.

(10) Patent No.: US 8,717,665 B2
(45) Date of Patent: May 6, 2014

(54) OPTICAL WAVELENGTH CONVERSION DEVICE, AND COHERENT LIGHT SOURCE USING SAME

(75) Inventors: Fabrice Alain Pierre Gerbier, Paris (FR); Emmanuel Simon Mimoun, Paris (FR); Jean Dalibard, Paris (FR); Jean-Jacques Zondy, Paris (FR)

(73) Assignee: Centre National de la Recherche Scientifique, Paris (FR)

( * ) Notice: Subject to any disclaimer, the term of this patent is extended or adjusted under 35 U.S.C. 154(b) by 535 days.

(21) Appl. No.: 12/996,496

(22) PCT Filed: Jun. 2, 2009

(86) PCT No.: PCT/FR2009/000635
§ 371 (c)(1),
(2), (4) Date: Jul. 20, 2011

(87) PCT Pub. No.: WO2009/147317
PCT Pub. Date: Dec. 10, 2009

(65) Prior Publication Data
US 2011/0267681 A1 Nov. 3, 2011

(30) Foreign Application Priority Data

Jun. 6, 2008 (FR) ..................................... 08 03153

(51) Int. Cl.
*G02F 1/35* (2006.01)
*H01S 3/10* (2006.01)
(52) U.S. Cl.
USPC ................ 359/326; 359/330; 372/21; 372/22
(58) Field of Classification Search
None
See application file for complete search history.

(56) References Cited

U.S. PATENT DOCUMENTS

| 6,005,878 | A  | * | 12/1999 | Kung et al. | ...................... 372/22 |
| 6,404,786 | B1 | * | 6/2002  | Kondo et al. | ................... 372/22 |
| 6,751,010 | B1 |   | 6/2004  | Richter |  |
| 7,035,297 | B1 |   | 4/2006  | Denman et al. |  |
| 7,110,426 | B2 | * | 9/2006  | Masuda | ......................... 372/21 |

FOREIGN PATENT DOCUMENTS

DE    10 2005 015 497    10/2006

OTHER PUBLICATIONS

Kozlovsky, W. J. et al., "Efficient Second Harmonic Generation of a Diode-Laser-Pumped CW Nd: YAG Laser Using Monolithic MgO: LiNbO$_3$ External Resonant Cavities", I.E.E.E. Journal of Quantum Electronics, IEEE Service Center, vol. 24, No. 6, pp. 913-919, XP 000140150, ISSN: 0018-9197, (Jun. 1, 1988).
International Search Report issued Nov. 26, 2009 in PCT/FR09/000635 filed Jun. 2, 2009.

\* cited by examiner

*Primary Examiner* — Hemang Sanghavi
(74) *Attorney, Agent, or Firm* — Oblon, Spivak, McClelland, Maier & Neustadt, L.L.P.

(57) ABSTRACT

The invention relates to an optical wavelength conversion device adapted to receive at least one first pump beam ($\lambda_1$) as an input and emitting a different wavelength output beam ($\lambda_S$), which includes: an optical cavity (CE); an optically non-linear medium (CNL) placed inside the optical cavity; and a control system (BA1) for controlling said optical cavity having the wavelength of the first pump beam; said control system being adapted to receive, as an input, a first signal ($S_1$) representing the power stored in the cavity having said first wavelength and a second signal ($S_2$) representing the power of the output beam. The invention also relates to a coherent light source comprising such a device and one or two pump laser sources (L1, L2).

11 Claims, 1 Drawing Sheet

OPTICAL WAVELENGTH CONVERSION DEVICE, AND COHERENT LIGHT SOURCE USING SAME

Figure 1:
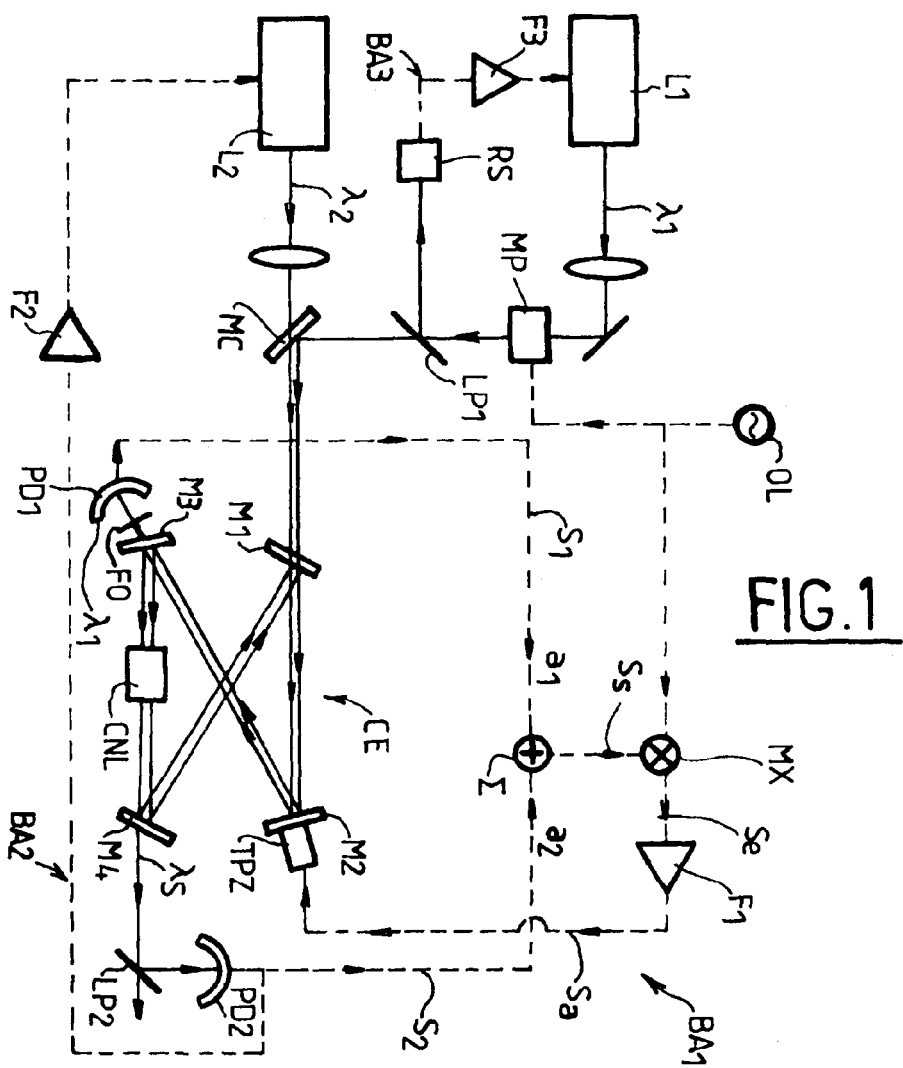

The invention relates to an optical wavelength conversion device and to a coherent light source using such a device.

Amongst the various laser sources, solid state and semiconductor sources present characteristics that are very advantageous in terms of energy efficiency, simplicity, robustness, compactness, and cost. Consequently they are among the lasers that are most commonly used in industry.

Nevertheless, most such sources emit only in the near infrared or in the red portion of the visible spectrum. To operate at shorter wavelengths, e.g. in the yellow, green, or blue ranges of the visible spectrum, or indeed in the ultraviolet, it has traditionally been necessary to have recourse to devices such as ion or dye lasers. Dye lasers in particular present such drawbacks (dye toxicity, operational instability, difficulties of use) that they are nowadays falling out of use.

To mitigate the drawbacks of those laser sources emitting directly in the visible or the ultraviolet, entirely solid state systems based on non-linear optical effects have been developed. In such systems, an infrared laser beam generated by a solid state source (referred to as a "pump" beam) is frequency doubled by interacting with a non-linear crystal (second-harmonic generation (SHG)). In a variant, two distinct pump beams are combined in such a non-linear crystal in order to generate a third beam at a frequency that is equal to the sum of the frequencies of the incident beams (sum-frequency generation (SFG)).

The weak point of such frequency conversion systems (or in equivalent manner such wavelength conversion systems) is their efficiency, which is often poor.

The simplest frequency conversion technique consists in placing the non-linear crystal on the trajectory of the freely propagating pump beam(s). In practice, that technique leads to conversion efficiencies that are too small, at least under continuous wave conditions, because of the insufficient intensity of the incident light field(s).

To improve conversion efficiency, it is known to place the non-linear crystal inside an optical cavity that is resonant with the pump beam(s), within which the light intensity can reach levels that are very high, even under continuous wave conditions.

In a second-harmonic generation system, the optical cavity used may be constituted by the resonator forming part of the infrared laser source. This possibility has been used with success by the supplier Coherent for its "Verdi" (trademark) range of lasers. Nevertheless, that technique is difficult to implement and to generalize.

An alternative that is more flexible in use consists in placing the non-linear crystal in an external resonant cavity, referred to as an exaltation cavity. An active or passive stabilization system serves to maintain the cavity in resonance with the pump laser beam(s), so as to optimize conversion efficiency, which may reach or even exceed 50%. By way of example, reference may be made to the following publications:

J. D. Vance, C. Y. She, and H. Moosmüller, "Continuous-wave, all solid-state, single-frequency 400 mW source at 589 nm based on doubly resonant sum-frequency mixing in a monolithic lithium niobate resonator", App. Opt. 37, pp. 4891-4896, 1998 (passive stabilization by means of the thermo-optical effect induced by residual intra-cavity absorption, efficiency greater than 40%); it should be observed that such passive servo-control is maximally unstable at the fringe of resonance, and is passband-limited around one kilohertz by heat diffusion in the crystal: see the article by A. Douillet, J. J. Zondy, A. Yelisseyev, S. Lobanov, L. Isaenko, "Stability and frequency tuning of thermally-loaded cw $AgGaS_2$ optical parametric oscillators", J. Opt. Soc. Am. B 16, pp. 1481-1498 (1999); and Joshua C. Bienfang, Craig A. Denman, Brent W. Grime, Paul D. Hillman, Gerald T. Moore, and John M. Telle, "20 W of continuous-wave sodium $D_2$ resonance radiation from sum-frequency generation with injection-locked lasers", Opt. Lett. 28, pp. 2219-2221, 2003 (active stabilization, efficiency greater than 55%); and also document U.S. Pat. No. 7,035,297.

The article by E. Jurdik et al. "Performance optimization of an external enhancement resonator for optical second-harmonic generation", J. Opt. Soc. Am. B 19, pp. 1660-1667, 2002 studies optimizing an enhancement cavity for second-harmonic generation and observes conversion efficiency of 53%.

In most circumstances, the cavity is frequency stabilized in active manner by means of a servo-control loop receiving as input an error signal generated either from a fraction of the pump laser that is reflected by the inlet coupler of the cavity, or from a small fraction of the intra-cavity power transmitted through one of the mirrors. The second alternative makes it possible to operate on a "black background" in order to avoid saturating the detectors when the cavity is not servo-controlled. The most widely used stabilization techniques are the following:

the Pound-Drever-Hall technique: see the article by Eric D. Black, "An introduction to Pound-Drever-Hall laser frequency stabilization", Am. J. Phys. 69, pp. 79-87, 2001;

the "AM-FM" technique that consists in weakly modulating the length of the cavity by means of a piezoelectric ceramic (providing amplitude modulation or "AM") in the vicinity of resonance, and then demodulating the signal by synchronous detection so as to generate an error signal proportional to the derivative of the resonance fringe; alternatively, the modulation may be imparted on the laser frequency (frequency modulation or "FM"); and the Hänsch-Couillaud technique: see T. W. Hänsch and B. Couillaud, "Laser frequency stabilization by polarization spectroscopy on a reflecting reference cavity", Opt. Commun. 35, 441 (1980).

Other techniques have also been proposed, such as the so-called "tilt locking" or "intentional misalignment" technique: see the article by D. A. Shaddok et al., "Frequency locking a laser to an optical cavity using spatial mode interference", Opt. Lett. 24, 1499 (1999).

Typically, two wavelength-tuning mechanisms are used: one of them being a "fast channel" that is fast but with narrow dynamic range and that corrects fluctuations at high frequency with a spectrum that is almost white (mechanical and acoustic vibration, laser frequency and amplitude noise, . . . ), and the other being a "slow channel" that is slower but with a broader dynamic range and that corrects fluctuations at low and very low frequency (long-term drift, e.g. thermal drift, . . . ). The error signal derived from the cavity, either in reflection or in transmission, is amplified and then integrated (proportional-integral (PI) servo-control), possibly differentiated (proportional-integral-derivative (PID) servo-control), and then used to control the above-described tuning mechanisms.

When two distinct pump beams are used (frequency sum generation), the cavity is kept tuned to the weaker beam, while the emission wavelength of the more intense pump laser is in turn servo-controlled to the resonant frequency of the cavity (see above-mentioned document U.S. Pat. No. 7,035,297).

The invention seeks to improve the efficiency of an optical wavelength conversion system of the type having an actively stabilized external cavity.

Common techniques for actively stabilizing optical cavities do not take account of the non-linear effects induced by the presence of the wavelength conversion crystal. However, the inventors have become aware of the fact that the non-linear dynamics in the crystal significantly disturb those servo-control schemes by reducing the power stored inside the cavity close to the resonance condition, at which wavelength conversion takes place with the greatest efficiency. The inventors have thus discovered that the conversion efficiency of systems known in the prior art is limited, above all because of the fact that this effect is not taken into account in satisfactory manner.

The invention enables this drawback of the prior art to be remedied and makes it possible to achieve conversion efficiency that may be as great as 90%.

More precisely, the invention provides an optical device for wavelength conversion, the device being adapted to receive as input at least a first coherent light beam, referred to as a first pump beam, at a first wavelength, and to emit at least one coherent light beam, referred to as an outlet beam, at a wavelength that is different from said first wavelength, the device comprising: an optical cavity; an optically non-linear medium located inside the optical cavity and suitable for interacting with said first pump beam to generate said outlet beam; and a servo-control system for servo-controlling a resonance mode of said optical cavity at said first wavelength; the device being characterized in that said servo-control system is adapted to receive as input a first signal representative of the energy stored in the cavity at said first wavelength, and a second signal representative of the power of the outlet beam emitted by the cavity; and to output a servo-control signal for servo-controlling the resonant wavelength of said optical cavity.

In particular, the servo-control system may be adapted to generate an error signal from a linear combination of said first and second signals.

The servo-control system may be based on a servo-control scheme based on: a Pound-Drever-Hall scheme; an AM-FM scheme; a "tilt locking" or intentional misalignment scheme; and a Hänsch-Couillaud scheme.

The device of the invention may also be adapted to receive as input a second coherent light beam, referred to as a second pump beam, at a second wavelength different from said first wavelength; wherein said optically non-linear medium is capable of interacting with said first and second pump beams to generate said outlet beam at the sum or difference frequency.

The invention also provides a coherent light source comprising: an optical wavelength conversion device as described above; and a laser source for generating said first pump beam.

Optionally, the invention may also comprise a second laser source for generating said second pump beam, Typically presenting power greater than the power of said first pump beam.

Under such circumstances, the source of the invention may also include a second servo-control system for servo-controlling the wavelength of said second pump beam at the resonant wavelength of said cavity. Advantageously, said second servo-control system may be adapted to servo-control the wavelength of said second pump beam in such a manner as to maximize the light power of said outlet beam.

In a particular embodiment of the invention, said second laser source may present two wavelength-tuning mechanisms, a "fast" first mechanism and a "slow" second mechanism that presents, relative to said first mechanism, a passband that is narrower and a dynamic range that is broader; and wherein said second servo-control system is adapted: when the power of said outlet beam drops below a first threshold, to block and reinitialize said slow wavelength tuning mechanism, and to use only said fast mechanism for servo-control; and when the power of said outlet beam exceeds a second threshold, higher than the first threshold, to reactivate control by the slow mechanism.

Optionally, the source of the invention may also include a third servo-control system for servo-controlling the wavelength of said first pump beam to an external reference.

Figure 2A:
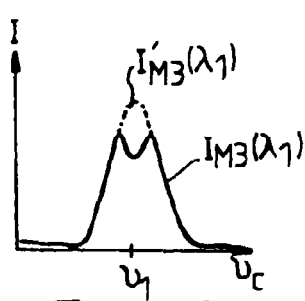
Figure 2B:
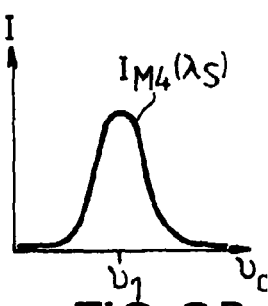
Figure 2C:
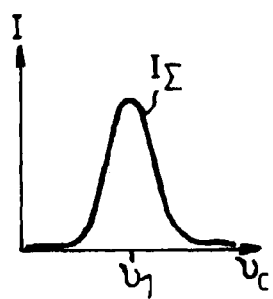

Other characteristics, details, and advantages of the invention appear on reading the following description made with reference to the accompanying drawing given by way of example and in which:

FIG. 1 is a diagram showing the principle of a coherent light source of the invention; and FIGS. 2A, 2B, and 2C are graphs of the signals used for servo-controlling the resonant cavity.

The coherent light source of FIG. 1 comprises an optical system and three servo-control loops. In the figure, the paths of light beams are represented by continuous lines and the paths of electronic signals by dashed lines.

The optical system comprises two pump lasers L1 and L2 emitting two pump beams at respective wavelengths $\lambda_1$ and $\lambda_2$. By way of example, the pump lasers L1 and L2 may be two neodymium-doped yttrium aluminium garnet (Nd:YAG) lasers oscillating continuously in a single longitudinal and transverse mode ($TEM_{00}$). The wavelength $\lambda_1$ of the first pump laser may be 1319.2 nanometers (nm) and the wavelength $\lambda_2$ of the second pump laser may be 1064.6 nm.

The two pump lasers are wavelength tunable, at least over a spectrum range of nanometer order. Typically, each laser has two wavelength-tuning mechanisms: one of them constituting a "fast channel", being fast but of restricted dynamic range, and the other constituting a "slow channel", being slower but with a broader dynamic range, "slow channel".

Below, it is considered that the first pump laser L1 presents emission power that is less than that of the second laser L2: it is thus the first laser that limits the emission power of the source at the sum frequency. In conventional manner, the non-linear conversion efficiency is defined as being the ratio of the photon flux output by the source to the photon flux of the first pump laser.

These two pump beams are combined by means of a dichroic mirror MC and injected into a resonant cavity CE, "exaltation cavity", in which there is placed a non-linear crystal CNL. In the figure, the trajectories of the two pump beams are represented by parallel lines that are spaced apart for reasons of readability; in reality, both beams are superposed so as to be able to interact inside the crystal.

The cavity CE is a "bow-tie" unidirectional ring cavity constituted by four mirrors M1, M2, M3, and M4. The first mirror M1 is partially transmissive at the wavelengths $\lambda_1$ and $\lambda_2$ so as to serve as an inlet coupler; typically, its reflectivity at these wavelengths lies in the range 95% to 99%, with the exact value being determined as a function of the nominal intensities of the pump beams (see above-mentioned article by E. Jurdik et al.). The other three mirrors M2, M3, and M4 present very high reflectivity, generally greater than 99.5%. The fourth mirror M4 is transmissive at the wavelength ($\lambda_s$) of the outlet beam generated in the non-linear crystal, and thus serves as an outlet coupler. The resonant wavelength of the cavity CE may be tuned by modifying its length by means of a piezoelectric actuator TPZ having the second mirror M2 mounted thereon. It is preferable to have two piezoelectric actuators for controlling the same mirror or two distinct mirrors, one of them fast but with relatively small dynamic range and the other one slower but with greater dynamic range.

The non-linear crystal CNL may be any type known in the prior art and adapted to the operating wavelengths of the source. For example it may be KTP ($KTiOPO_4$) that is periodically polarized. Regulating the temperature of the crystal, e.g. using a thermoelectric module, serves to obtain phase tuning at the desired wavelength (or more precisely quasi phase tuning for a material that is polarized periodically).

The non-linear KTP crystal is placed to coincide with the maximum focus point of the two pump beams.

The mixing of the two pump beams within the crystal CNL generates an outlet beam at a frequency that is equal to the sum of the frequencies of the pump beams, and having the same space and time coherence properties, since a coherent process is involved. In this example, the outlet wavelength is 582.9 nm and is thus situated in the yellow portion of the visible spectrum.

In order to obtain efficient wavelength conversion, it is necessary to maximize the intensity of the pump beams in the cavity CE. To do this, and in known manner, the cavity is servo-controlled to the emission wavelength of the weaker laser source L1, referred to for this reason as the "master" laser. Servo-control is performed by means of a first servo-control loop BA1 that controls the actuator TPZ of the mirror M2. Thereafter, the second pump laser L2, "slave" laser, is servo-controlled at the wavelength of the cavity by means of a second servo-control loop BA2. This control architecture is itself known: see for example above-mentioned document U.S. Pat. No. 7,035,297.

Optionally, the "master" laser L1 may in turn be servo-controlled to an external spectroscopic reference RS by means of a third servo-control loop BA3 in order to stabilize the wavelength at the outlet from the source.

In wavelength conversion systems known in the prior art, the first servo-control loop BA1 for servo-controlling the exaltation cavity CE to the master laser L1 is designed in such a manner as to keep close to zero an error signal that is generated by detecting the fraction of the first pump beam that is reflected by the inlet coupler of the cavity (mirror M1). In a variant, it is possible to make use of the fraction of the power at the wavelength of the first pump beam that is stored in the cavity and that leaks through one of the other mirrors of said cavity. It is this second option that is shown in FIG. 1: the light that leaks from the cavity through the mirror M3 is filtered by the dichroic mirror FO to isolate therefrom the component at the wavelength $\lambda_1$, which is then detected by the sensor (photodetector) PD1.

In FIG. 2A, the dashed line curve $I'_{M3}(\lambda_1)$ illustrates the way the intensity of the radiation at the wavelength $\lambda_1$ that "leaks" from the cavity depends on the resonant frequency $v_c$ of the cavity C3 in the absence of the non-linear crystal CNL. This curve has a lorentzian shape and presents a very clear peak at $v_c=v_1$ (where $v_1$ is the frequency of the first pump beam). When the frequency tuning is performed between the cavity and the laser L1, the energy stored in the cavity at the wavelength $\lambda_1$ is at a maximum, and consequently the intensity of the leak is also at a maximum.

The cavity CE may thus be servo-controlled, in theory, by maximizing the value of $I'_{M3}(\lambda_1)$.

In reality, it is known in the prior art that the signal $I'_{M3}(\lambda_1)$ cannot be used as such by the servo-control loop because of its symmetrical shape about the maximum point. That is why techniques have been proposed to generate an error signal that is proportional to the derivative of $I'_{M3}(\lambda_1)$ relative to $v_c$. The most widespread method is the Pound-Drever-Hall method. In accordance with that technique, the first pump beam is phase modulated by a Pockels cell MP controlled by an oscillator OL operating at radiofrequency; thereafter, the signal from the detector PD1 is demodulated coherently by mixing it with the radiofrequency signal generated by the oscillator OL (radiofrequency mixer MX); finally, the signal output by the mixer MX is filtered (filter $F_1$) to provide the required error signal. The theory on which the Pound-Drever-Hall method is based is described in detail in the above-mentioned article by Eric D. Black.

In reality, the non-linear crystal CNL introduces losses in the cavity CE due to the frequency conversion. These losses increase with increasing conversion efficiency, and they are therefore at a maximum when the cavity tuning condition is satisfied. Still with reference to FIG. 2A, the continuous line curve $I'_{M3}(\lambda_1)$ illustrates the dependency of the intensity of the radiation at the wavelength $\lambda_1$ that "leaks" from the cavity CE as a function of the resonant frequency $v_c$ thereof, in the presence of very efficient wavelength conversion. It can be seen that the losses introduced by the non-linear conversion "dig a hole" in the graph of $I'_{M3}(\lambda_1)$. The inventors have taken account of this fact and have deduced that under such conditions the error signal obtained by applying the Pound-Drever-Hall method (or any equivalent method) to the signal coming from the photodetector PD1 is no longer suitable for servo-controlling the cavity.

The invention provides a solution to this previously unrecognized problem of the prior art.

In accordance with the invention, the error signal of the servo-control loop BA1 is not generated solely from the fraction of the first pump beam that leaks from the cavity, but also by taking account of the light power emitted by said cavity at the sum frequency. To do this, a beam-splitter LP2 is placed on the path of the outlet beam from the source so as to direct a fraction of said beam to a second photodetector PD2.

In FIG. 2B, the curve $I_{M4}(\lambda_s)$ shows how the power emitted at the wavelength $\lambda_s$ depends on the resonant frequency $v_c$ of the cavity CE. This curve presents a very clear peak centered on the tuned condition $v_c=v_1$. The idea on which the invention is based is to use the peak of the curve $I_{M4}(\lambda_s)$ to "fill in" the hole dug by the non-linear conversion in the peak of the curve of $I_{M3}(\lambda_1)$. In FIG. 2C, the curve $I_\Sigma$ represents the signal that is obtained by adding the signals $I_{M4}(\lambda_s)$ and $I_{M3}(\lambda_1)$ (after weighting them with appropriate coefficients).

Specifically, in the source of the invention, the signal $s_1$ generated by the first photodetector PD1, and the signal $s_2$ generated by the second photodetector PD2 are weighted by coefficients $a_1$ and $a_2$, and then they are added together in a sum node $\Sigma$. The sum signal $s_s$ from the node $\Sigma$ is then delivered as input to the mixer MX in order to be demodulated in coherent manner and filtered by a lowpass filter (not shown). The error signal $s_e$ as obtained in this way is input to the loop filter $F_1$ to generate the servo-control signal $s_s$ that controls the piezoelectric actuator TPZ.

It is of interest to observe that the Pound-Drever-Hall technique may be applied to the signal $s_s$ because, since the generation of the sum frequency is a coherent phenomenon, the phase modulation of the pump beam is to be found in the sum beam $\lambda_2$.

The operation of the first control loop is described above with reference to the Pound-Drever-Hall technique. However, other servo-control techniques known in the prior art (and in particular the Hänsch-Couillaud technique) may also be used.

In any event, the principle is to generate the error signal from a linear combination of a first signal representative of the energy stored in the cavity at the wavelength of the first pump beam and a second signal representative of the light power generated in the cavity at the sum frequency.

If a Pound-Drever-Hall type technique is used, it is generally advantageous to use a relatively low phase modulation frequency $v_{LO}$ (of the order of 1 MHz) such that the side bands introduced into the spectrum of the first pump laser lie within the resonance band of the cavity (which is always of finite width) when said cavity is tuned. Nevertheless, this condition is not essential.

The second servo-control loop BA2 of the "slave" laser L2 of the cavity CE may be of any type known in the prior art, and in particular it may be based in turn on a Pound-Drever-Hall type technique (with frequency modulation different from that used by the first servo-control loop). However, in order to avoid overloading the figure, the Pockels cell, the radiofrequency oscillator, and the mixer/demodulator used in the second loop are not shown. The figure therefore shows only the acquisition of the signal $s_2$ from the second photodetector PD2 and the filtering thereof by the loop filter F2 in order to generate a control signal that controls the second pump source L2 in such a manner as to maximize the efficiency of the non-linear conversion.

Nevertheless, the inventors have observed that very efficient wavelength conversion also gives rise to a difficulty in the operation of the second servo-control loop.

The resonance width of the cavity depends on its losses. Unfortunately, the losses introduced by the wavelength conversion are proportionally much greater for the master laser (less intense) than for the slave laser. It follows that the second servo-control loop is more "fragile" than is the first loop, which it is nevertheless supposed to track. There therefore exists a risk of the servo-control signal of the slave laser L2 saturating in the event of too great a difference occurring on the resonance condition, as a result of a transient disturbance (vibration, instability of an electrical power supply, . . . ).

To mitigate this drawback, the invention proposes making use of the presence of two wavelength-tuning mechanisms for the laser L2, a first mechanism that is relatively fast but that presents a restricted dynamic range, and a second mechanism that is slower but that presents a broader dynamic range.

Normally, servo-control is performed by acting on both mechanisms ("fast" and "slow") together. Nevertheless, when the outlet power at the sum frequency drops below a first threshold, the loop uses a sample-and-hold circuit to block said slow mechanism and to reinitialize, in order to avoid saturating the control signal. If the loop is of the PID type, it is opened and the integrator it includes is reset to zero by being short circuited. In contrast, the fast servo-control mechanism continues to be controlled, preferably in proportional manner only. When the power of the output beam increases once more to exceed a second threshold (greater than said first threshold), the slow servo-control mechanism of the laser L2 is reactivated.

The optional, third servo-control loop BA3 that stabilizes the emission wavelength of the master laser L1 does not require any particular comments. It is shown in simplified manner in order to avoid overloading FIG. 1 (spectrum reference RS, beam-splitter LP1, and loop filter F3).

The invention is described above with reference to a particular example, but numerous variants are possible.

In particular, these variants may relate to:
the types of the pump lasers, which may in particular be solid state or semiconductor lasers;
the pump and source emission wavelengths;
the servo-control technique on which the first loop is based: any technique known in the prior art (Hänsch-Couillaud, intentional misalignment) may be suitable for implementing the invention; and
the non-linear medium used for wavelength conversion.

In addition, although only the circumstance of a non-degenerative frequency sum is considered above, the invention is also capable of using other non-linear frequency conversion effects, such as generating a second (or higher order) harmonic, with a single pump laser then being used, generating a difference frequency, or parametric amplification.

The invention claimed is:

1. An optical device for wavelength conversion, the device being adapted to receive as input at least a first coherent light beam, referred to as a first pump beam, at a first wavelength ($\lambda_1$), and to emit at least one coherent light beam, referred to as an outlet beam, at a wavelength ($\lambda_s$) that is different from said first wavelength, the device comprising:
an optical cavity (CE);
an optically non-linear medium (CNL) located inside the optical cavity and suitable for interacting with said first pump beam to generate said outlet beam; and
a servo-control system (BA1) for servo-controlling a resonance mode of said optical cavity at said first wavelength;
the device being characterized in that said servo-control system is adapted to receive as input a first signal ($s_1$) representative of the energy stored in the cavity at said first wavelength, and a second signal ($s_2$) representative of the power of the outlet beam emitted by the cavity; and to output a servo-control signal ($s_a$) for servo-controlling the resonant wavelength of said optical cavity.

2. An optical device according to claim 1, wherein the servo-control system is adapted to generate an error signal ($s_e$) from a linear combination of said first and second signals.

3. An optical device according to either preceding claim, wherein the servo-control system (BA1) is based on at least one of:
a Pound-Drever-Hall scheme;
an AM-FM scheme;
a "tilt locking" or intentional misalignment scheme; and
a Hänsch-Couillaud scheme.

4. An optical device according to claim 1, also adapted to receive as input a second coherent light beam, referred to as a second pump beam, at a second wavelength ($\lambda_2$) different from said first wavelength; wherein said optically non-linear medium is capable of interacting with said first and second pump beams to generate said outlet beam at the sum or difference frequency.

5. A coherent light source comprising:
an optical wavelength conversion device according to claim 1; and
a laser source (L1) for generating said first pump beam.

6. A coherent light source comprising:
an optical wavelength conversion device according to claim 4;
a first laser source (L1) for generating said first pump beam; and
a second laser source (L2) for generating said second pump beam.

7. A coherent light source according to claim 6, wherein said second pump beam presents power greater than that of said first pump beam.

8. A coherent light source according to claim 6, also including a second servo-control system (BA2) for servo-controlling the wavelength of said second pump beam at the resonant wavelength of said cavity.

9. A coherent light source according to claim 8, wherein said second servo-control system is adapted to servo-control the wavelength of said second pump beam in such a manner as to maximize the light power of said outlet beam.

10. A coherent light source according to claim 6, wherein said second laser source presents two wavelength-tuning mechanisms, a "fast" first mechanism and a "slow" second mechanism that presents, relative to said first mechanism, a passband that is narrower and a dynamic range that is broader; and wherein said second servo-control system is adapted:
  when the power of said outlet beam drops below a first threshold, to block and reinitialize said slow wavelength tuning mechanism, and to use only said fast mechanism for servo-control; and
  when the power of said outlet beam exceeds a second threshold, higher than the first threshold, to reactivate control by the slow mechanism.

11. A coherent light source according to claim 5, also including a third servo-control system (BA3) for servo-controlling the wavelength of said first pump beam to an external reference.

* * * * *